(12) United States Patent
McCaffrey

(10) Patent No.: US 12,351,711 B2
(45) Date of Patent: Jul. 8, 2025

(54) STARCH COMPOSITIONS

(71) Applicant: PLANTIC TECHNOLOGIES LIMITED, Altona (AU)

(72) Inventor: Nicholas John McCaffrey, Altona (AU)

(73) Assignee: PLANTIC TECHNOLOGIES LIMITED, Altona (AU)

( * ) Notice: Subject to any disclaimer, the term of this patent is extended or adjusted under 35 U.S.C. 154(b) by 0 days.

(21) Appl. No.: 17/295,892

(22) PCT Filed: Feb. 28, 2020

(86) PCT No.: PCT/AU2020/050184
§ 371 (c)(1),
(2) Date: May 21, 2021

(87) PCT Pub. No.: WO2020/172722
PCT Pub. Date: Sep. 3, 2020

(65) Prior Publication Data
US 2021/0388183 A1 Dec. 16, 2021

(30) Foreign Application Priority Data
Feb. 28, 2019 (AU) ................................ 2019900640

(51) Int. Cl.
*B32B 9/02* (2006.01)
*B32B 9/04* (2006.01)
(Continued)

(52) U.S. Cl.
CPC .................................... *C08L 3/08* (2013.01);
*B32B 9/02* (2013.01); *B32B 9/045* (2013.01);
*B32B 9/06* (2013.01);
(Continued)

(58) Field of Classification Search
CPC ................................................. C08L 3/00–10
See application file for complete search history.

(56) References Cited

U.S. PATENT DOCUMENTS 5,346,936 A 9/1994 Buehler et al.
6,235,894 B1 5/2001 Kettlitz et al.
(Continued)

FOREIGN PATENT DOCUMENTS

EP 3008124 B1 1/2019
WO 2007140538 A1 12/2007
(Continued)

OTHER PUBLICATIONS

International Search Report and Written Opinion issued in corresponding International Patent Application No. PCT/AU2020/050184 mailed Apr. 28, 2020 (10 pages).
(Continued)

*Primary Examiner* — Liam J Heincer
(74) *Attorney, Agent, or Firm* — Kilyk & Bowersox, P.L.L.C.

(57) ABSTRACT

Extruded starch compositions and methods for their preparation are provided. The compositions possess a high degree of cook which imparts particular viscosity characteristics. The compositions may be formed into films having advantageous properties such as low haze, high strength and high gas barrier. The starch compositions find use in a wide range of applications, particularly, but not exclusively, in the manufacture of thin films for packaging.

17 Claims, 3 Drawing Sheets

(51) Int. Cl.
- *B32B 9/06* (2006.01)
- *B32B 27/30* (2006.01)
- *B32B 27/32* (2006.01)
- *B32B 27/36* (2006.01)
- *C08J 5/18* (2006.01)
- *C08L 3/06* (2006.01)
- *C08L 3/08* (2006.01)

(52) U.S. Cl.
CPC ............ *B32B 27/304* (2013.01); *B32B 27/32* (2013.01); *B32B 27/36* (2013.01); *C08J 5/18* (2013.01); *C08L 3/06* (2013.01); *B32B 2264/1027* (2020.08); *B32B 2307/558* (2013.01); *B32B 2307/7163* (2013.01); *B32B 2307/7244* (2013.01); *B32B 2307/7246* (2013.01); *B32B 2435/02* (2013.01); *B32B 2439/06* (2013.01); *B32B 2439/70* (2013.01); *C08J 2303/06* (2013.01); *C08J 2303/08* (2013.01); *C08J 2329/04* (2013.01); *C08L 2203/16* (2013.01); *C08L 2205/06* (2013.01)

(56) References Cited

U.S. PATENT DOCUMENTS

| | | | |
|---|---|---|---|
| 7,094,817 | B2 | 8/2006 | Halley et al. |
| 7,495,044 | B2 | 2/2009 | Long et al. |
| 7,595,015 | B1* | 9/2009 | Wang ............... C08B 30/14 264/141 |
| 7,740,952 | B2* | 6/2010 | Hausmann ............ C08L 3/08 428/522 |
| 7,854,994 | B2 | 12/2010 | Henderson-Rutgers et al. |
| 8,410,200 | B2* | 4/2013 | Oakley ................ B29C 48/21 524/47 |
| 8,569,402 | B2* | 10/2013 | Henderson ...... A61F 13/15252 524/52 |
| 8,697,245 | B2 | 4/2014 | Khemani et al. |
| 9,540,810 | B2 | 1/2017 | Sang et al. |
| 9,745,453 | B2 | 8/2017 | Khemani et al. |
| 2006/0260973 | A1 | 11/2006 | Macinnes et al. |
| 2006/0293419 | A1 | 12/2006 | Yu et al. |
| 2009/0312462 | A1* | 12/2009 | Oakley ................ C08L 3/02 524/47 |
| 2014/0349047 | A1* | 11/2014 | McCaffrey ........... C08L 29/04 428/35.7 |
| 2015/0210461 | A1 | 7/2015 | Morris et al. |
| 2017/0029601 | A1 | 2/2017 | McCaffrey |
| 2017/0208851 | A1* | 7/2017 | Kerwood ............. A61K 47/36 |
| 2020/0339785 | A1* | 10/2020 | Ota ..................... C08L 3/06 |

FOREIGN PATENT DOCUMENTS

| | | |
|---|---|---|
| WO | 2008074096 A1 | 6/2008 |
| WO | 2019003077 A1 | 1/2019 |
| WO | 2019073393 A1 | 4/2019 |
| WO | 2019180671 A1 | 9/2019 |
| WO | 2020136598 A1 | 7/2020 |

OTHER PUBLICATIONS

International Preliminary Report on Patentability issued in corresponding International Patent Application No. PCT/AU2020/050184 dated Feb. 2, 2021 (20 pages).

Hagenimana et al, "Evaluation of rice flour modified by extrusion cooking," Journal of Cereal Science, 2006, vol. 43, pp. 38-46.

Harper, "Extrusion Processing of Starch," Developments in Carbohydrate Chemistry, Amer. Assoc. Cereal Chem., St. Paul MN, 1994, pp. 37-64.

International Starch Institute, ISI 19-6e Determination of Viscosity of Starch by Brabender—Comments, 1999, (http://www.starch.dk/isimethods/19brabenderNotes.htm).

Paton et al, "Simulated Approach to the Estimation of Degree of Cooking of an Extruded Cereal Product," Cereal Chemistry, 1981, vol. 58, pp. 216-220.

Stevenson et al, "Starch Structures and Physicochemical Properties of a Novel beta-glucan-enriched Oat Hydrocolloid Product with and without Supercritical Carbon Dioxide Extraction," American Journal of Food Technology, 2007, vol. 2, No. 4, pp. 248-256.

Ryu et al, "Pasting of wheat flour extrudates containing conventional baking ingredients," J. Food Sci., 1993, vol. 58, No. 3, pp. 567-573 (Abstract only).

Liu, Q., "Understanding Starches and Their Role in Foods," Food Carbohydrates Chemistry, Physical Properties, and Applications, 2005, Edited by Steve W. Cui. CRC Press, Boca Raton, DOI: 10.1201/9780203485286, pp. 309-355.

Wang, A. "Which is correct? Starch cooking vs. Starch Gelatinization," 2021, IDAH website, https://blog.idah.com/2021/12/16/starch-cooking (7 pages).

* cited by examiner

STARCH COMPOSITIONS

The present application is a National Stage Application of PCT/AU2020/050184, filed Feb. 28, 2020, which claims priority to Australian Patent Application No. 2019900640, filed Feb. 28, 2019.

FIELD

The present disclosure relates to extruded starch compositions and methods for their preparation. The compositions may be formed into films having advantageous properties such as low haze, high strength and high gas barrier. The starch compositions find use in a wide range of applications, particularly, but not exclusively, in the manufacture of thin films for packaging.

BACKGROUND

Extrusion cooking of starch materials has been widely studied during the last twenty years. Conversion of starch properties in the extruder depends on a large number of variables in the equipment and raw material parameters. Independent process parameters include screw speed, screw configuration, product moisture content, temperature, total mass flow rate and die configuration.

Extrusion processing of starch compositions involves the breakdown of starch and its interaction with the other components in the compositions. Starch, and its degree of transformation by thermal and mechanical inputs, plays a dominant role in determining final product properties. Therefore, measuring starch transformation is a reasonable approach to assess final product quality. The degree of starch transformation may be described by the 'degree of cook' (see Paton, D. and Spratt, W. A. (1981), Simulated approach to the estimation of degree of cooking of an extruded cereal product, Cereal Chem. 58:216-220).

Off-line pasting viscometry has been shown to adequately measure degree of cook in starch (see Harper, J. M. (1994), Extrusion Processing of Starch. R. Alexander, J. and Zobel, H. F. (eds.) Developments in Carbohydrate Chemistry, Amer. Assoc. Cereal Chem., St Paul MN. 37-64). The method involves monitoring the viscosity of a starch composition solution as a function of temperature and time. This has been used to quantify the water soluble 'cooked' component, the granular 'uncooked' component that pastes during the test, and the overall viscosity that indicates degree of starch conversion. Ryu et al suggested that the Rapid Visco Analyser (RVA) could be used for off-line control as it provides a relatively rapid measure of starch degradation (Ryu, G. H., Neumann, P. E. and Walker, C. E. (1993), Pasting of wheat flour extrudates containing conventional baking ingredients. J. Food Sci. 58(3):567-573). The RVA provides an index of how cooked a sample is by measuring viscosity under relatively low shear in excess water and measuring the pasting viscosity throughout the test.

Despite advances in starch processing there remains a need to provide starch compositions that possess desirable characteristics, particularly characteristics that impart advantageous mechanical, optical and gas barrier performance in thin films. The present disclosure addresses this need.

The reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which this specification relates.

SUMMARY

In one aspect the present disclosure provides a starch composition comprising at least one starch, chemically modified starch, or mixtures thereof, wherein the starch composition has a peak cold viscosity of greater than about 700 mPa·s.

In some embodiments the peak cold viscosity may be greater than about 750 mPa·s, or greater than about 800 mPa·s, or greater than about 850 mPa·s, or greater than about 900 mPa·s, or greater than about 950 mPa·s, or greater than about 1000 mPa·s, or greater than about 1050 mPa·s, or greater than about 1100 mPa·s, or greater than about 1150 mPa·s, or greater than about 1200 mPa·s, or greater than about 1250 mPa·s, or greater than about 1300 mPa·s.

In other embodiments the peak cold viscosity may be greater than about 1350 mPa·s, or greater than about 1400 mPa·s, or greater than about 1450 mPa·s, or greater than about 1500 mPa·s, or greater than about 1550 mPa·s, or greater than about 1600 mPa·s.

In some embodiments the peak cold viscosity of the starch composition may be from about 700 mPa·s to about 1300 mPa·s, or from about 800 mPa·s to about 1300 mPa·s, or from about 900 mPa·s to about 1300 mPa·s, or from about 700 mPa·s to about 1200 mPa·s, or from about 700 mPa·s to about 1100 mPa·s, or from about 700 mPa·s to about 1000 mPa·s, or between about 700 mPa·s and about 900 mPa·s.

In other embodiments the peak cold viscosity of the starch composition may be from about 1300 mPa·s to about 2000 mPa·s, or from about 1300 mPa·s to about 1900 mPa·s, or from about 1300 mPa·s to about 1800 mPa·s, or from about 1300 mPa·s to about 1700 mPa·s, or from about 1400 mPa·s to about 2000 mPa·s, or from about 1400 mPa·s to about 1900 mPa·s, or from about 1500 mPa·s to about 1900 mPa·s.

In some embodiments the final viscosity of the starch composition is greater than about 700 mPa·s, or greater than about 800 mPa·s, or greater than about 900 mPa·s, or greater than about 1000 mPa·s, or greater than about 1100 mPa·s.

In other embodiments the final viscosity of the starch composition is greater than about 300 mPa·s, or greater than about 400 mPa·s, or greater than about 500 mPa·s, or greater than about 600 mPa·s.

In some embodiments the final viscosity of the starch composition may be from about 700 mPa·s to about 1200 mPa·s, or from about 800 mPa·s to about 1200 mPa·s, or from about 900 mPa·s to about 1200 mPa·s.

In other embodiments the final viscosity of the starch composition may be from about 400 mPa·s to about 900 mPa·s, or from about 500 mPa·s to about 800 mPa·s, or from about 500 mPa·s to about 700 mPa·s.

In some embodiments the ratio of the peak cold viscosity of the starch composition to the final viscosity of the starch composition is greater than or equal to about 1.0.

In some embodiments the ratio of the peak cold viscosity of the starch composition to the final viscosity of the starch composition is greater than or equal to about 1.1, or greater than or equal to about 1.2, or greater than or equal to about 1.3, or greater than or equal to about 1.4, or greater than or equal to about 1.5, or greater than or equal to about 1.6.

In other embodiments the ratio of the peak cold viscosity of the starch composition to the final viscosity of the starch composition is greater than or equal to about 2.0, or greater than or equal to about 2.1, or greater than or equal to about 2.2, or greater than or equal to about 2.3, or greater than or equal to about 2.4, or greater than or equal to about 2.5.

In some embodiments the starch composition has a peak cold viscosity of greater than about 700 mPa·s and a ratio of peak cold viscosity to final viscosity of greater than or equal to about 1.0.

In other embodiments the starch composition has a peak cold viscosity of greater than about 1500 mPa·s and a ratio of peak cold viscosity to final viscosity of greater than or equal to about 2.5.

As used herein peak cold viscosity and final viscosity are defined as the viscosities measured by the following procedure, using a Rapid Visco Analyser Model RVA Super 3 (Newport Scientific, Sydney, New South Wales, Australia).

2.5 g of starch composition (dry weight basis) to be tested is mixed with about 25 g of distilled water to give a total test solution weight of 28 g based on the starch component. The instrument mixing parameters are as follows: mix at 960 rpm for 30 seconds and 160 rpm for 36.5 minutes. The instrument temperature parameters are as follows: 15 minutes at 30° C., heating from 30° C. to 95° C. for 5 minutes, 3 minutes hold at 95° C., cooling from 95° C. to 30° C. for 3 minutes, 11 minutes hold at 30° C., for a total of 37 minutes. The peak cold viscosity is the maximum viscosity prior to initiating heating, that is, the maximum viscosity during the initial 15 minutes at 30° C. The final viscosity is the maximum viscosity during the 11-minute holding period at 30° C.

It has been discovered that starch compositions possessing the herein disclosed viscosity characteristics may possess advantageous mechanical, gas barrier and/or optical properties.

Another aspect the present disclosure provides a starch composition comprising at least one starch, chemically modified starch or mixtures thereof, wherein the starch composition has a degree of cook of at least about 90%, preferably at least about 95%.

In another aspect the present disclosure provides a method for making a starch composition according to any one of the herein disclosed embodiments, the method comprising the step of melt processing the starch composition under conditions sufficient to impart a specific mechanical energy (SME) to the starch composition of at least about 400 kJ/kg.

In some embodiments the specific mechanical energy imparted to the starch composition is at least about 500 kJ/kg, or at least about 600 kJ/kg, or at least about 700 kJ/kg, or at least about 800 kJ/kg, or at least about 900 kJ/kg.

Starch or Chemically Modified Starch

In some embodiments the starch or chemically modified starch may be independently selected from wheat starch, corn starch, tapioca starch, potato starch, cassava starch, pea starch, oat starch, arrowroot starch or rice starch and mixtures thereof.

In some embodiments the chemically modified starch, when present, may be based on the same starch as the unmodified starch.

In other embodiments the chemically modified starch may be based on a different starch to the unmodified starch.

In some embodiments the starch composition may comprise mixtures of starches and/or chemically modified starches, for example, mixtures of high and low amylose starch, wherein one or more of the starch components may be chemically modified.

According to any one or more of the herein disclosed aspects the amylose content of the at least one starch and/or modified starch may be greater than 10% by weight, or greater than 20% by weight, or greater than 30% by weight, or greater than 40% by weight, or greater than 50% by weight, or greater than 60% by weight, or greater than 70% by weight, or greater than 80% by weight.

In some embodiments the amylose content of the starch and/or modified starch may be between 50% and 80% by weight.

In some embodiments the chemically modified starch is modified so as to replace hydroxyl functionality with functionality selected from the group consisting of ethers and esters and mixtures thereof.

Preferred esters comprise heptanoate or lower homologues. Particularly preferred esters include acetate.

In some embodiments the chemically modified starch may be modified to include a hydroxyalkyl $C_{2-6}$ group or modified by reaction with an anhydride of a carboxylic acid. Preferably the modified starch may be modified to include a hydroxy $C_{2-4}$ group. More preferably the modified starch may be modified to include a hydroxy propyl group.

In some embodiments the chemically modified starch may be modified so as to have a degree of substitution from 0.01 to 3.0, or from 0.01 to 2.5, or from 0.01 to 2.0, or from 0.01 to 1.5. The degree of substitution defines the average number of substituents per anhydroglucose unit. Accordingly, by definition, the maximum possible degree of substitution of starch is 3.0.

Water Soluble Polymer

In some embodiments the starch composition further comprises one or more water soluble polymers.

Exemplary, but non-limiting, water soluble polymers may be selected from the group consisting of polyvinylacetate, polyvinyl alcohol, polyoxyalkylene or mixtures thereof. Polyvinyl alcohol and polyethylene oxide and mixtures thereof are preferred water soluble polymers.

Preferably, the starch compositions comprise 1 to 20% by weight of a water soluble polymer, more preferably from 4 to 12% by weight of a water soluble polymer.

The water soluble polymer component of the starch composition is preferably biodegradable and has a low melting point compatible with the processing temperatures for starch.

Water

In some embodiments the starch composition may comprise water, preferably up to 20% by weight water, more preferably up to 12% by weight water. In some embodiments the water may serve as a plasticizer. In some embodiments water may be the only plasticizer present in the composition.

Plasticizers

In some embodiments the starch composition further comprises at least one plasticizer other than water.

The starch composition may comprise one or more polyol plasticizers, for example up to 50% by weight of one or more polyol plasticizers, or up to 25% by weight of one or more polyol plasticizers. Exemplary, but non-limiting, polyol plasticizers may be selected from the group consisting of sorbitol, glycerol, maltitol, mannitol, xylitol, erythritol, ethylene glycol, diethylene glycol and mixtures thereof.

The starch composition may comprise less than 5% by weight of polyol plasticizers. In some embodiments the starch composition may be substantially free of polyol plasticizers.

A range of plasticizers and humectants are useful additions to the starch composition, in order to aid processing and control and stabilize mechanical properties, in particular in reducing dependency on moisture content and relative humidity. The desired plasticizer content depends primarily on the required processing behaviour during extrusion and any subsequent blowing or stretching processes as well as on the required mechanical properties of the end product.

The plasticizer plays a triple role:
1. it provides suitable rheology for the extrusion compounding process
2. it positively affects the mechanical properties of the product and,
3. it may act as an anti-retrogradation or anti-crystallizing agent.

Sorbitol, glycerol and maltitol blends are particularly suitable for modifying the mechanical properties of the formulation, as is xylitol and blends of xylitol with sorbitol and glycerol. The larger the number of OH groups, the more effective the plasticizer is in reducing crystallisation. Sorbitol, maltitol and xylitol are particularly good humectants. Glycerol helps dissolve polyvinylalcohol during processing. Crystallisation is observed when sorbitol is used on its own. Some polyols (sorbitol and glycerol in particular) may exhibit migration to the surface, where either an opaque crystalline film may form in the case of sorbitol, or an oily film in the case of glycerol. Blending various polyols inhibits this effect to varying degrees. Stabilisation may be enhanced with the addition of glycerol monostearate and sodium stearoyl lactylate as emulsifiers.

Other Plasticizers

Polyethylene glycol compounds may be used as emulsifying agents, plasticizers or humectants and may also provide an increased water resistance.

An alternative plasticizer is epoxidized linseed oil or epoxidized soybean oil. Being hydrophobic these additives may improve moisture sensitivity of the material. These plasticizers, preferably stabilized with an emulsifying system, aid processing but do not result in a significant further reduction in Young's modulus. Other plasticizers more commonly used in the PVC industry may be suitable, including tributyl citrate, 2,2,4 trimethyl-1,3-pentanediol diisobutyrate, and acetyl tri-ethyl citrate.

Up to 20% of a humectant or water binding agent or gelling agent which may act as a (co)plasticizer may be present in the starch composition, such as carrageenan, xanthan gum, gum arabic, guar gum or gelatine. Other humectants may be used such as sugar or glucose. Biopolymers such as carrageenan, typically used in food products as thickeners and partially soluble in cold water, fully soluble in hot water, are suitable to tailor mechanical properties. By binding water these components may have a significant plasticizing function. Gelatine may be added to improve the mechanical properties and reduce moisture sensitivity. Xanthan Gum has a high water holding capacity and also acts as an emulsifier and in starch compositions has an anti-retrogradation effect. Gum Arabic may also be used as a texturiser and film former, and the hydrophilic carbohydrate and hydrophobic protein enable its hydrocolloid emulsification and stabilization properties. Guar gum has similar anti-crystallisation effects in starch compositions. Another suitable humectant is glyceryl triacetate.

Fatty Acid and/or Fatty Acid Salt

In a further embodiment the starch compositions may comprise a lubricant. Preferred lubricants are C12-22 fatty acids and/or C12-22 fatty acid salts. Preferably, the C12-22 fatty acid and/or a C12-22 fatty acid salt are present in an amount up to 5% by weight.

The starch composition preferably comprises between 0.1 to 1.5% by weight of a $C_{12-22}$ fatty acid and/or a $C_{12-22}$ fatty acid salt. The fatty acid and/or fatty acid salt component is more preferably present in concentrations of 0.3 to 1%. Stearic acid is a particularly preferred component. Sodium and potassium salts of stearic acid may also be used. Lauric, myristic, palmitic, linoleic and behenic acids are also suitable acids.

Fillers and Nanomaterials

In some embodiments the starch composition further comprises one or more fillers or nanomaterials.

In some embodiments the amount of filler is up to 20% by weight based on the total dry weight of the starch composition.

In some embodiments the filler or nanomaterial is exfoliated within a starch nanocomposite.

In some embodiments the nanomaterials include clays, carbon nanotubes, cellulose nanowhiskers and chitin whiskers.

In some embodiments the clay includes montmorillonite, bentonite, beidelite, mica, hectorite, saponite, nontronite, sauconite, vermiculite, ledikite, magadite, kenyaite, stevensite, volkonskoite or mixtures thereof.

In some embodiments the nanomaterials are hydrophobically or hydrophilically modified.

In some embodiments the nanomaterials may be modified clays, particularly hydrophobically modified layered silicate clays.

A 'hydrophobically modified layered silicate clay' or 'hydrophobic clay' is preferably a clay modified by exchange with a surfactant comprising long chain alkyl groups. A long chain alkyl group may comprise greater than 4, or 5, or 6 carbon atoms per chain. Preferably the alkyl groups do not contain polar substituents. Preferred surfactants comprise long chain alkylammonium ion, for example, mono- or di-$C_{12}$-$C_{22}$ alkylammonium ion. Preferably, polar substituents such as hydroxyl or carboxyl are not attached to the long chain alkyl. Examples of suitable hydrophobically modified clays include NANOMER I.40P from Nanocor, Inc or CLOISITE™ 20A or CLOISITE™ 10A from Southern Clay Products, Inc.

In another aspect the present disclosure provides an article of manufacture comprising the starch compositions according to any one or more of the herein disclosed aspects or embodiments.

In another aspect the present disclosure provides a thermoformed article comprising the starch composition according to any one or more of the herein disclosed aspects or embodiments.

In another aspect the present disclosure provides a film comprising the starch composition according to any one or more of the herein disclosed aspects or embodiments.

The thickness of the film may be between 1 micron and 1000 micron, or between 5 micron and 800 micron, or between 10 micron and 600 micron.

In some embodiments the films have exceptional clarity. In some embodiments the films have a haze of less than 20% when measured on a 150 micron thick film.

In some embodiments the films have high Spencer impact strength as measured by ASTM D3420.

In some embodiments the films have a Spencer impact strength of greater than 18 mN/μm when measured on a 150 micron film according to ASTM D3420.

In some embodiments the films have a haze of less than 20% and a Spencer impact of greater than 18 mN/μm when measured on a 150 micron film according to ASTM D3420.

In some embodiments the films have high gas barrier. In some embodiments the films have an oxygen permeation coefficient of less than 0.05 $cm^3$ mm/$m^2$·24 h·atm at 50% relative humidity (RH) or less than 0.01 $cm^3$ mm/$m^2$·24 h·atm at 50% relative humidity (RH).

In some embodiments the films according to the present disclosure may form part of a multilayer film structure.

Accordingly, in another aspect the present disclosure provides a multilayer film comprising at least one layer comprising a starch composition according to any one or more of the herein disclosed aspects or embodiments and at least one other layer.

The other layer may be selected from the group consisting of polyolefin, polyethylene terephthalate, polyethylene terephthalate glycol, polybutylene succinate, polyhydroxy butyrate, polylactic acid, nylon, polyvinylchloride, polyvinylidene dichloride, cellulose, a water resistant protein layer, a water resistant layer comprising silica and combinations thereof.

Further features and advantages of the present disclosure will be understood by reference to the following drawings and detailed description.

DETAILED DESCRIPTION OF THE EMBODIMENTS

Figure 1:
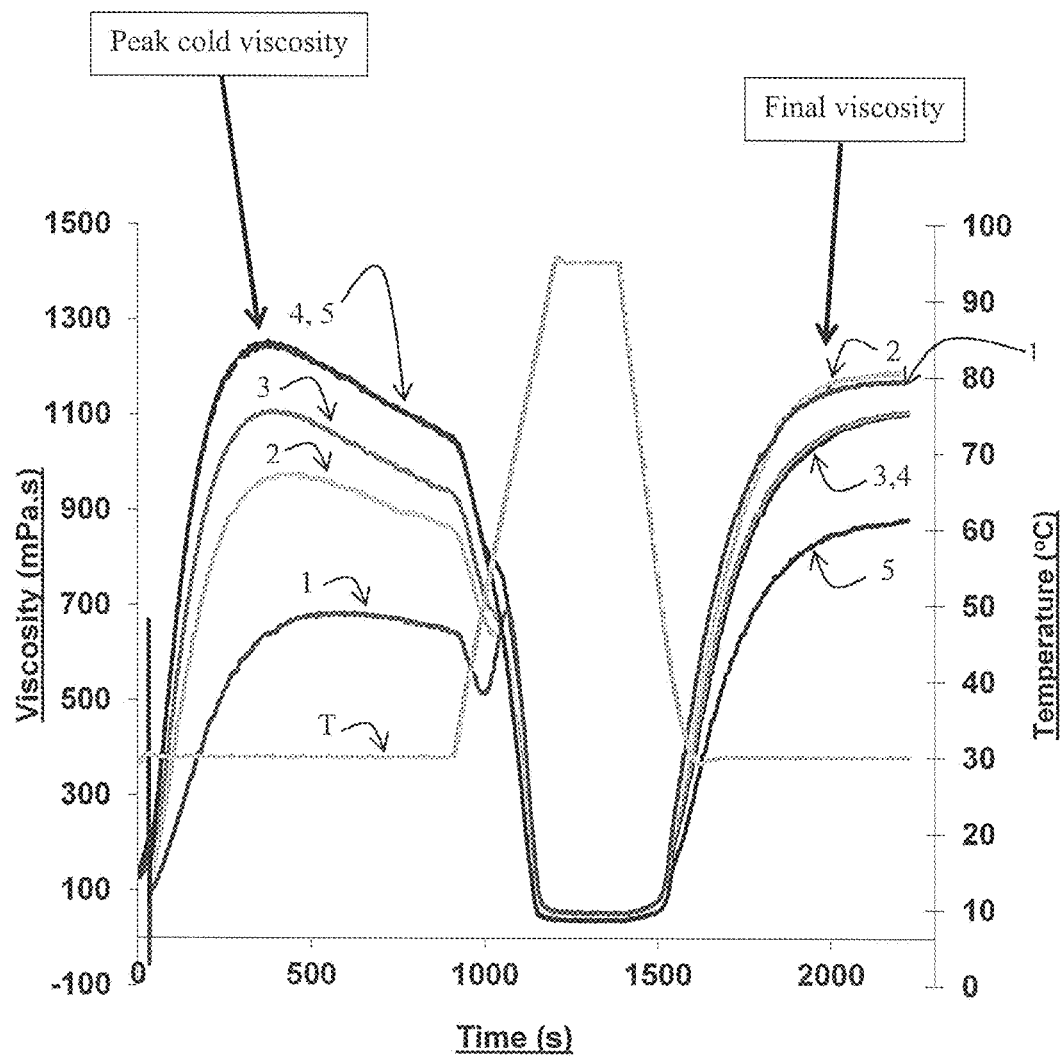
FIG. 1 is a plot of starch composition solution viscosity as a function of temperature and time.

The following is a detailed description of the disclosure provided to aid those skilled in the art in practicing the present disclosure. Those of ordinary skill in the art may make modifications and variations in the embodiments described herein without departing from the spirit or scope of the present disclosure.

Although any methods and materials similar or equivalent to those described herein can also be used in the practice or testing of the present disclosure, the preferred methods and materials are now described.

It must also be noted that, as used in the specification and the appended claims, the singular forms 'a', 'an' and 'the' include plural referents unless otherwise specified. Thus, for example, reference to 'starch' may include more than one starches, and the like.

Throughout this specification, use of the terms 'comprises' or 'comprising' or grammatical variations thereon shall be taken to specify the presence of stated features, integers, steps or components but does not preclude the presence or addition of one or more other features, integers, steps, components or groups thereof not specifically mentioned.

Unless specifically stated or obvious from context, as used herein, the term 'about' is understood as within a range of normal tolerance in the art, for example within two standard deviations of the mean. 'About' can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein in the specification and the claim can be modified by the term 'about'.

Ranges provided herein are understood to be shorthand for all the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

As used herein the term 'degree of cook' when applied to starch or starch composition is synonymous with percentage conversion of a starch or starch composition and refers to the degree to which an un-cooked, granular starch is gelatinized or converted into a water soluble, thermoplastic starch.

As used herein the term 'specific mechanical energy' (SME), having the units kJ/kg, refers to the mechanical energy input imparted by the screw per kg of raw material throughput Amylose Content of Starch According to any one or more of the herein disclosed aspects or embodiments the amylose content of the at least one starch or modified starch may be greater than 10% by weight, or greater than 20% by weight, or greater than 30% by weight, or greater than 40% by weight, or greater than 50% by weight, or greater than 60% by weight, or greater than 70% by weight, or greater than 80% by weight.

Preferably, the amylose content of the starch or modified starch is greater than or equal to 50% by weight.

In some preferred embodiments the amylose content of the starch or modified starch may be between 50% and 80% by weight.

A preferred starch is a maize starch having an amylose content of greater than or equal to 50% by weight. Another preferred starch is a tapioca starch having an amylose content of greater than or equal to 50%

Modified Starch

A preferred modified starch component is hydroxypropylated starch. Other substituents may be hydroxyethyl or hydroxybutyl to form hydroxyether substitutions, or anhydrides such as maleic, phthalic or octenyl succinic anhydride can be used to produce ester derivatives.

The degree of substitution (the average number of hydroxyl groups in a unit that are substituted) is preferably 0.05 to 1.5.

Another preferred modified starch is a hydroxypropylated starch wherein the starch has an amylose content of greater than or equal to 50% by weight. A preferred modified starch component is a hydroxypropylated high amylose starch, for example ECOFILM™ marketed by Ingredion or Gelose™ A939 marketed by Penford.

Water Soluble Polymer

Exemplary, but non-limiting, water soluble polymers may be selected from the group consisting of polyvinylacetate, polyvinyl alcohol, polyalkylene oxide or mixtures thereof. Polyvinyl alcohol and polyethylene oxide and mixtures thereof are preferred water soluble polymers.

Preferably, the starch compositions comprise 1 to 20% by weight of a water soluble polymer, more preferably from 4 to 12% by weight of a water soluble polymer.

The water soluble polymer component of the starch composition is preferably biodegradable and has a low melting point compatible with the processing temperatures for starch.

The degree of saponification of the polyvinyl alcohol is preferably 80 to 99.8 mol %. The degree of saponification is more preferably 85 mol % or more, more preferably 88 mol % or more. As used herein, the degree of saponification refers to a molar fraction of hydroxyl groups with respect to the total of hydroxyl groups and ester groups in polyvinyl alcohol.

The polyvinyl alcohol may further comprise other monomer units than vinyl alcohol units. Other monomer units include monomer units derived from ethylenically unsaturated monomers and the like. Ethylenically unsaturated monomers include: α-olefins such as ethylene, propylene, isobutylene, 1-hexene; acrylic acid and its salts; unsaturated monomers having methacrylate ester groups; acrylamide, N-methylacrylamide, N,N-dimethylacrylamide, diacetolylamide propanesulfonate and its salts; methacrylamide, N-methylmethacrylamide N-ethylmethacrylamide, propanesulfonate and its salts (e.g., quaternary salts); methylvinyl ether, ethylvinyl ether, n-propylvinyl ether, i-propylvinyl ether, vinyl ethers such as i-butylvinyl ether, t-butylvinyl ether, dodecylvinyl ether, and 2,3-diacetoxy-1-vinyloxypropane; vinyl chlorides such as acrylonitrile and methacrylonitrile; vinylides such as vinylidene chloride and vinylidene fluoride; allyl compounds such as allyl acetate, 2,3-diacetoxy-1-aryloxypropane, and allyl chlorides; maleic acid, unsaturated dicarboxylic acid and its salts or esters; vinyl isopropenyl acetate; vinyl acetate, vinyl propionate, vinyl butyrate, vinyl pivalanate, vinyl chaprolate, vinyl carrylate, vinyl laurylate, vinyl palmitate, vinyl stearate, vinyl ester monomers such as vinyl oleate, vinyl benzoate are exemplified. Monomer units derived from unsaturated monomers that have not been saponified are also included in the other monomer units. The content of the other monomer units is preferably 10 mol % or less, more preferably 5 mol % or less.

The method for producing the polyvinyl alcohol is not particularly limited. For example, vinyl alcohol monomers and optionally other monomers may be polymerized and the resulting polymer may be saponified and converted to vinyl alcohol units.

Examples of the polymerization methods include batch polymerization, semi-batch polymerization, continuous polymerization, semi-continuous polymerization, and the like. Methods of polymerization include known methods such as bulk polymerization, solution polymerization, suspension polymerization, and emulsion polymerization. Known methods can be applied to the saponification of the polymer. For example, it can be carried out in a state in which the polymer is dissolved in an alcohol or a water-containing alcohol. The alcohol that can be used at this time is preferably a lower alcohol such as methanol or ethanol, for example.

The polyvinyl alcohol preferably has a viscosity of 1 mPa·s or more, more preferably 2 mPa·s or more, more preferably 3 mPa·s or more, preferably 45 mPa·s or less, more preferably 35 mPa·s or less, of a 4% aqueous solution measured according to JIS Z 8803 at 20° C.

The polyoxyalkylene represents a polyalkylene oxide and a polyalkylene glycol, and comprises units represented by the following formula (1). The polyoxyalkylene may have two or more different units (1).

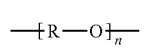  (1)

wherein R is an alkylene group and n is 1 or more.

In the formula (1), the alkylene group, for example, ethylene group, propylene group, trimethylene group, butylene group, isobutylene group, pentylene group, hexylene group, hexylene group, octylene group, nonylene group, alkylene group carbon atomic number of the decylene group or the like is 2 to 10. Among these, an alkylene group having 2 to 6 carbon atoms is preferable, and an ethylene group and/or a propylene group are more preferable. When n is 2 or more, these alkylene groups can be used alone or in combination of two or more kinds. As alkylene groups, methylene groups, ethylene groups, propylene groups, butylene groups are preferred.

In the formula (1), n is preferably 5 or more, more preferably 50 or more, more preferably 100 or more, preferably 120,000 or less, more preferably 70,000 or less. When the polyoxyalkylene contains different units, the number of repeats n of each building block may be the same or different.

The polyalkylene oxide includes, for example, a polymer having a structural unit derived from an alkylene oxide having 2 to 6 carbon atoms, and specifically includes polyethylene oxide, polypropylene oxide, polytrimethylene oxide (polyoxetane), polybutylene oxide, polyisobutylene oxide, or copolymers of monomers constituting these. The polyalkylene glycol includes, for example, a polymer having a structural unit derived from an alkylene glycol having 2 to 6 carbon atoms, and specifically includes polyethylene glycol, polypropylene glycol, polytrimethylene glycol, polybutylene glycol, polyisobutylene glycol, or a copolymer of monomers constituting these. Among these, the polyoxyalkylene is preferably polyethylene oxide, polypropylene oxide, polyethylene glycol, polypropylene glycol, or a copolymer of monomers constituting these. As the copolymer, a copolymer of ethylene oxide and propylene oxide, a copolymer of ethylene glycol and propylene glycol, or the like is preferable.

The polyoxyalkylene may contain a unit derived from another monomer other than the unit (1). When the polyoxyalkylene is a copolymer, the polymer form of the copolymer is not particularly limited, and may be random, block, graft, or tapered.

The weight average molecular weight of the polyoxyalkylene is preferably 10,000 or more, more preferably 50,000 or more, preferably 5,000,000 or less, more preferably 3,000,000 or less.

A commercially available polyoxyalkylene can also be used. Examples of typical commercial products of polyoxyalkylene (C) include Alcox™ E-75G, Alcox™ L-11, Alcox™ L-6, Alcox™ EP1010N, and Peo™ PEO-1, PEO-2, manufactured by Sumitomo Seika Corporation.

Applications

The herein disclosed starch compositions may be useful in a variety of applications. For example, the starch compositions may be thermoformed into articles utilizing methods well known in the art. Exemplary thermoformed articles may include trays, containers or lids. The starch compositions may also be useful as components in multilayer films, including, for example, barrier trays for extending the shelf life of perishable foods, including meat, poultry, fish, pasta, small goods, prepared meals and cheese. The starch compositions may also be useful in Modified Atmosphere Packaging (MAP) requiring control of gas permeation.

Multilayer Films

The herein disclosed starch composition may be useful in the manufacture of a multilayer film said multilayer film comprising:
 (a) at least one layer comprising a starch composition according to any one of the aspects or embodiments as herein disclosed; and
 (b) at least one other layer.

The at least one other layer may have a water vapour permeability coefficient less than 1 g·mm/m²·24 hr·atm measured at 38° C. and 90% relative humidity.

The total thickness of the at least one layer comprising a starch composition may be greater than 20% of the total thickness of the multilayer film.

The water vapour permeability coefficient of the at least one other layer may be less than 0.5 g·mm/m$^2$·24 hr·atm measured at 38° C. and 90% relative humidity, or less than 0.2 g·mm/m$^2$·24 hr·atm measured at 38° C. and 90% relative humidity.

The total thickness of the at least one layer comprising a starch composition may be greater than 30% of the total thickness of the multilayer film, or greater than 40% of the total thickness of the multilayer film, or greater than 50% of the total thickness of the multilayer film. The total thickness of the at least one layer comprising a starch composition may be greater than 60% of the total thickness of the multilayer film.

The starch layer may have a low oxygen permeability coefficient (OPC). The starch layer has an OPC less than 0.6 cm$^3$ mm/m$^2$·24 h·atm at 50% relative humidity (RH). The starch layer may have an OPC of less than 0.3 cm$^3$ mm/m$^2$·24 h·atm at 50% RH or an OPC of less than 0.2 cm$^3$ mm/m$^2$·24 h·atm at 50% RH. The starch layer may have an OPC of less than 0.1 cm$^3$ mm/m$^2$·24 h·atm at 50% RH or the starch layer may have an OPC of less than 0.05 cm$^3$ mm/m$^2$·24 h·atm at 50% RH.

The starch layer may have an OPC less than 1.2 cm$^3$ mm/m$^2$·24 h·atm at 75% relative humidity (RH). The starch layer may have an OPC of less than 0.6 cm$^3$ mm/m$^2$·24 h·atm at 75% RH or an OPC of less than 0.2 cm$^3$ mm/m$^2$·24 h·atm at 75% RH. The starch layer may have an OPC of less than 0.1 cm$^3$ mm/m$^2$·24 h·atm at 75% RH or the starch layer may have an OPC of less than 0.05 cm$^3$ mm/m$^2$·24 h·atm at 75% RH.

The OPC may remain below 0.05 cm$^3$ mm/m$^2$·24 h·atm at 50% RH, for extended periods of time. The OPC may remain below 0.05 cm$^3$ mm/m$^2$·24 h·atm at 50% RH for at least ten days, or the OPC may remain below 0.05 cm$^3$ mm/m$^2$·24 h·atm at 50% RH for 20 days, or the OPC may remain below 0.05 cm$^3$ mm/m$^2$·24 h·atm at 50% RH for thirty days. The OPC may remain below 0.05 cm$^3$ mm/m$^2$·24 h·atm at 50% RH for thirty days.

The OPC may remain below 0.05 cm$^3$ mm/m$^2$·24 h·atm at 75% RH, for extended periods of time. The OPC may remain below 0.05 cm$^3$ mm/m$^2$·24 h·atm at 75% RH for at least ten days, or the OPC may remain below 0.05 cm$^3$ mm/m$^2$·24 h·atm at 75% RH for 20 days, or the OPC may remain below 0.05 cm$^3$ mm/m$^2$·24 h·atm at 75% RH for thirty days. The OPC may remain below 0.05 cm$^3$ mm/m$^2$·24 h·atm at 75% RH for thirty days.

The multilayer film may have a low oxygen permeability coefficient (OPC). The multilayer film has an OPC less than 0.6 cm$^3$ mm/m$^2$·24 h·atm at 50% relative humidity (RH). The multilayer film may have an OPC of less than 0.3 cm$^3$ mm/m$^2$·24 h·atm at 50% RH or an OPC of less than 0.2 cm$^3$ mm/m$^2$·24 h·atm at 50% RH. The multilayer film may have an OPC of less than 0.1 cm$^3$ mm/m$^2$·24 h·atm at 50% RH or the multilayer film may have an OPC of less than 0.05 cm$^3$ mm/m$^2$·24 h·atm at 50% RH.

The multilayer film may have an OPC less than 1.2 cm$^3$ mm/m$^2$·24 h·atm at 75% relative humidity (RH). The multilayer film may have an OPC of less than 0.6 cm$^3$ mm/m$^2$·24 h·atm at 75% RH or an OPC of less than 0.2 cm$^3$ mm/m$^2$·24 h·atm at 75% RH. The multilayer film may have an OPC of less than 0.1 cm$^3$ mm/m$^2$·24 h·atm at 75% RH or the multilayer film may have an OPC of less than 0.05 cm$^3$ mm/m$^2$·24 h·atm at 75% RH.

The OPC may remain below 0.05 cm$^3$ mm/m$^2$·24 h·atm at 50% RH, for extended periods of time. The OPC may remain below 0.05 cm$^3$ mm/m$^2$·24 h·atm at 50% RH for at least ten days, or the OPC may remain below 0.05 cm$^3$ mm/m$^2$·24 h·atm at 50% RH for 20 days, or the OPC may remain below 0.05 cm$^3$ mm/m$^2$·24 h·atm at 50% RH for thirty days. The OPC may remain below 0.05 cm$^3$ mm/m$^2$·24 h·atm at 50% RH for thirty days.

The OPC may remain below 0.05 cm$^3$ mm/m$^2$·24 h·atm at 75% RH, for extended periods of time. The OPC may remain below 0.05 cm$^3$ mm/m$^2$·24 h·atm at 75% RH for at least ten days, or the OPC may remain below 0.05 cm$^3$ mm/m$^2$·24 h·atm at 75% RH for 20 days, or the OPC may remain below 0.05 cm$^3$ mm/m$^2$·24 h·atm at 75% RH for thirty days. The OPC may remain below 0.05 cm$^3$ mm/m$^2$·24 h·atm at 75% RH for thirty days.

Accordingly, the multilayer films have an enhanced performance in respect of oxygen barrier properties over long periods of time. The time to reach equilibrium moisture content may be extended using controlled water vapour transmission rate other layers. The equilibrium % moisture content within the starch layer may be lower due to % relative humidity/% moisture content gradients within the other layer materials.

Such longevity in respect of gas barrier performance is clearly desirable in extending the shelf life of packaged perishable foodstuffs.

Advantageously, from a renewable perspective the multilayer film may contain a high proportion of biodegradable starch.

The thickness of the multilayer film and of each layer within the multilayer film may vary depending on the exact nature of the end use application.

The total thickness of the multilayer film may be between 10 and 1000 microns. The total thickness of the multilayer film may be between 10 and 100 microns, or between 20 and 80 microns. The total thickness of the multilayer film may be between 100 and 1000 microns or between 200 and 800 microns.

The total thickness of the at least one layer comprising a starch composition may be between 5 and 600 microns. The total thickness of the at least one layer comprising a starch composition may be between 5 and 50 microns, or between 10 and 40 microns. The total thickness of the at least one layer comprising a starch composition may be between 100 and 600 microns, or between 150 and 450 microns.

The total thickness of the at least one other layer may be between 5 and 400 microns. The total thickness of the at least one other layer may be between 5 and 25 microns or between 10 and 20 microns. The total thickness of the at least one other layer may be between 30 and 400 microns, or between 30 and 300 microns.

The at least one layer comprising a starch composition may have a total thickness between 100 and 600 micron and the at least one other layer may have a total thickness between 10 and 400 micron. The at least one layer comprising a starch composition may have a total thickness between 100 and 400 micron and the at least one other layer may have a total thickness between 40 and 250 micron.

The at least one layer comprising a starch composition may have a total thickness between 10 and 60 micron and the at least one other layer may have a total thickness between 5 and 40 micron.

The at least one layer comprising a starch composition may comprise water, preferably up to 20% by weight water, more preferably up to 12% by weight water. The water may serve as a plasticizer.

The moisture content of the at least one layer comprising a starch composition may be the equilibrium moisture content at the environmental % relative humidity. For example, the equilibrium moisture content may range from about 4% at low % RH to more than 15% at high % RH.

The at least one layer comprising a starch composition may also comprise up to 50% by weight of natural unmodified starch.

The layer comprising a starch composition and/or the other layer may comprise colourants.

Other Layer

The other layer(s) may be chosen to impart certain physical and aesthetic properties to finished multilayer film. These properties may include, for example, biodegradability in soil, water, marine or other environments, antifog, strength, heat sealability, colour, or clarity. The other layers may be those having a low water vapour transmission rate.

The at least one other layer may comprise a polyolefin, polyethylene terephthalate, polyethylene terephthalate glycol, polybutylene succinate, polyhydroxy butyrate, polylactic acid, nylon, polyvinylchloride, polyvinylidene dichloride, cellulose, a water resistant protein layer, a water resistant layer comprising silica, or mixtures thereof. Each of the other layers may comprise a mixture of components. One or more of the other layers may consist of multiple layers of different materials. Each of the other layers may comprise different materials. The layers may be solvent cast or sputter coated.

Suitable polyolefins for the preparation of the polyolefin film layer may be selected from the group consisting of ethylene homopolymers, propylene homopolymers, interpolymers of ethylene and propylene and interpolymers of ethylene or propylene with one or more $C_4$-$C_{10}$ α-olefins, cyclic olefin polymers and copolymers, biaxially orientated polypropylene, and mixtures thereof.

Suitable polyolefins may be selected from copolymers of ethylene or propylene and one or more α-olefins. Both high density polyethylenes and linear low density polyethylenes may be utilised.

Suitable linear low density polyethylenes (LLDPE) may include copolymers of ethylene and α-olefins (about 5 to about 15 wt. %). Alpha-olefins may include 1-butene, 1-hexene, 1-octene, and the like, and mixtures thereof. The density of LLDPE is within the range of about 0.865 to about 0.925 $g/cm^3$ Suitable high density polyethylenes (HDPE) may include ethylene homopolymers and copolymers of ethylene and α-olefins (about 0.1 to about 10 wt. %). Suitable alpha-olefins may include 1-butene, 1-hexene, 1-octene, and the like, and mixtures thereof. The density of HDPE is preferably from about 0.940 to about 0.970 $g/cm^3$.

Suitable cyclic olefin polymers and copolymers may include polymers of norbornene or tetracyclododecene and copolymers of norbornene or tetracyclododecene with one or more α-olefins. Examples include cyclic olefin polymers are Topas (Ticona) and Apel (Mitsui).

Blends of polyolefins and other polymers may be advantageously employed. Cast polypropylene (cPP) or biaxially oriented polypropylene (BOPP) may be chosen for improved strength and low WVTR. Polyethylene terephthalate (PET) may be chosen for strength and shrinkability.

Modified polyolefins, such as grafted polyolefins, may be utilized. A preferred grafted polyolefin is a maleic anhydride grafted polyolefin.

Polyolefins

Suitable LLDPE, HDPE and polypropylene may be produced by a Ziegler, single-site, or any other olefin polymerization catalyst. Ziegler catalysts and co-catalysts are well known in the art. Metallocene single-site catalysts are transition metal compounds that contain cyclopentadienyl (Cp) or Cp derivative ligands. For example, U.S. Pat. No. 4,542,199, teaches the preparation of metallocene catalysts. Non-metallocene single-site catalysts containing heteroatomic ligands, e.g., boraaryl, pyrrolyl, azaborolinyl or quinolinyl are also well known in the art.

The HDPE may also be multimodal. By "multimodal" it is meant that the polymer comprises at least two components, one of which has a relatively low molecular weight, the other a relatively high molecular weight. The multimodal polyethylene can be produced by polymerization using conditions that create a multimodal polymer product. This can be accomplished by using a catalyst system with two or more different catalytic sites or by using two or multi-stage polymerization processes with different process conditions in the different stages (e.g. different temperatures, pressures, polymerization media, hydrogen partial pressures, etc). Multimodal HDPE may be produced by a multistage ethylene polymerization, using a series of reactors, with comonomer addition in only one of the reactors.

The at least one other layer may comprise one or more materials derived from one or more renewable materials. The polyethylene or polypropylene may be derived from one or more renewable materials. The polyethylene may be prepared from ethanol derived from, for example, sugar cane, sugar beet or wheat grain. The polyethylene terephthalate may be derived from bio-polyols.

Adhesive

The at least one other layer may be fixed to the at least one layer comprising a starch composition through use of a suitable adhesive. This may assist in minimising slip and therefore maintaining excellent barrier performance. Numerous suitable adhesives would be apparent to those having skill in the present art. The adhesive may be selected to chemically bond to the at least one layer comprising a starch composition. Useful adhesives may comprise one or more polyurethanes or epoxies.

Advantageously, the use of an adhesive may overcome or minimise the need for modified or grafted other layers to be utilized as tie layers. Accordingly, for example, standard film polyethylene grades may be successfully employed as polyolefin other layers in the multi-layer film. This may be desirable from a cost consideration.

Other suitable adhesives may include EVA copolymers, acrylic copolymers and terpolymers, ionomers, metallocene derived polyethylene, maleic anhydride modified polyethylene, ethylene acrylic ester terpolymers and ethylene vinyl acetate terpolymers.

Those skilled in the art will be familiar with other adhesive lamination technology that would be suitable for adhering various types of plastics, including heat activated and UV activated systems. Exemplary adhesives may include, polyurethane, epoxy, nylon, acrylic and acrylate.

Polyurethane based adhesives may be particularly suitable for fixing the other layer to the layer comprising a starch composition. The polyurethane adhesive may be prepared in situ through reaction of one or more isocyanates with the starch layer. Through reaction of the surface hydroxyl functions of the starch with isocyanate, urethane functions are formed. Preferred isocyanates are diisocyanates. Those skilled in the art would be able to select suitable isocyanates from the wide range typically employed in the art of polyurethane synthesis.

Alternatively, the polyurethane adhesive may comprise one or more polyols. Such two component systems comprising diisocyanate and polyol are well known in the art.

The adhesives may or may not contain solvent. The solvent may be organic or water based.

Exemplary isocyanates include methylene diphenyl diisocyanate and toluene diisocyanate. Exemplary polyols include polyether polyols such as polyethylene glycol or polypropylene glycol and polyester polyols such as adipate based polyols.

Method of Preparation of the Multilayer Film

The multilayer film may be made by a variety of processes. The multilayer film may be made by co-extrusion, coating, extrusion coating, extrusion lamination and other laminating processes. The film may also be made by casting or blown film processes.

Coextrusion tends to use tie layers, and utilises modified other layers, such as modified (grafted) polyolefins. Coextrusion is generally able to achieve thinner overall gauges. Lamination is more suitable for thicker multilayer films utilising an adhesive. Extrusion coating may produce a coated product in an in-line process. Extrusion coating can apply much thinner polymer layers of polyolefin or polyester on to a substrate using a suitable adhesive resin.

In one embodiment a three layer film is provided comprising an inner layer comprising the starch composition and two outer polyolefin layers. In other embodiments adhesive layers may be employed between the layer comprising the starch composition and the polyolefin layers thus yielding a five layer film.

In another embodiment the starch layer may be extrusion coated onto a film substrate, for example a biaxially orientated polypropylene or paper substrate and then another layer, for example, a polyolefin or polyester layer, may be extrusion coated onto the starch layer.

Applications of Multilayer Film

It will be understood by those with skill in the art that a three or five layer film is only one of many possible embodiments that employs starch and other layers. The number of layers and their relative thicknesses may be adjusted depending on the function or end-use of the film.

Additionally, further film layers comprising other materials commonly utilized in barrier film applications may be envisaged. Exemplary further film layers include metallized films, non-polymer films and the like.

The multilayer film may have many applications including grocery bags, stretch-wraps, food packaging films, package containers, package lids where low water vapour and oxygen transmission rates are required.

The following details exemplary embodiments according to the present disclosure.

Embodiment 1

A film, said film having a thickness between 10 and 600 microns, said film comprising a starch composition, comprising at least one starch, chemically modified starch or mixtures thereof;
wherein the starch composition has a peak cold viscosity of greater than 700 mPa·s.

Embodiment 2

A film, said film having a thickness between 10 and 600 microns, said film comprising a starch composition, comprising at least one starch, chemically modified starch or mixtures thereof;
wherein the starch composition has a final viscosity of greater than 1000 mPa·s.

Embodiment 3

A film, said film having a thickness between 10 and 600 microns, said film comprising a starch composition comprising at least one starch, chemically modified starch or mixtures thereof;
wherein the starch composition has a degree of cook of at least 90%, preferably at least 95%.

Embodiment 4

A film, said film having a thickness between 10 and 600 microns, said film comprising a starch composition comprising at least one starch, chemically modified starch or mixtures thereof;
wherein the at least one starch, chemically modified starch or mixtures thereof comprises a starch having an amylose content greater or equal to 50% by weight; and
wherein the starch composition has a peak cold viscosity of greater than 700 mPa·s.

Embodiment 5

A film, said film having a thickness between 10 and 600 microns, said film comprising a starch composition comprising at least one starch, chemically modified starch or mixtures thereof;
wherein the at least one starch, chemically modified starch or mixtures thereof comprises a starch having an amylose content greater or equal to 50% by weight; and
wherein the starch composition has a final viscosity of greater than 1000 mPa·s.

Embodiment 6

A film, said film having a thickness between 10 and 600 microns, said film comprising a starch composition comprising at least one starch, chemically modified starch or mixtures thereof;
wherein the at least one starch, chemically modified starch or mixtures thereof comprises a starch having an amylose content greater or equal to 50% by weight; and
wherein the starch composition has a degree of cook of at least 90%, preferably at least 95%.

Embodiment 7

A film, said film having a thickness between 10 and 600 microns, said film comprising a starch composition comprising at least one starch, chemically modified starch or mixtures thereof;
wherein the at least one starch, chemically modified starch or mixtures thereof comprises a starch having an amylose content greater or equal to 50% by weight;
wherein the starch composition has a peak cold viscosity of greater than 700 mPa·s; and
wherein the film has a haze of less than 25% measured on a 150 micron film according to ASTM D1003.

Embodiment 8

A film, said film having a thickness between 10 and 600 microns, said film comprising a starch composition comprising at least one starch, chemically modified starch or mixtures thereof;

wherein the at least one starch, chemically modified starch or mixtures thereof comprises a starch having an amylose content greater or equal to 50% by weight;
wherein the starch composition has a final viscosity of greater than 1000 mPa·s; and
wherein the film has a haze of less than 25% measured on a 150 micron film according to ASTM D1003.

Embodiment 9

A film, said film having a thickness between 10 and 600 microns, said film comprising a starch composition comprising at least one starch, chemically modified starch or mixtures thereof;
wherein the at least one starch, chemically modified starch or mixtures thereof comprises a starch having an amylose content greater or equal to 50% by weight;
wherein the starch composition has a degree of cook of at least 90% preferably at least 95%; and
wherein the film has a haze of less than 25% measured on a 150 micron film according to ASTM D1003.

Embodiment 10

A film, said film having a thickness between 10 and 600 microns, said film comprising a starch composition comprising at least one starch, chemically modified starch or mixtures thereof;
wherein the at least one starch, chemically modified starch or mixtures thereof comprises a starch having an amylose content greater or equal to 50% by weight;
wherein the starch composition has a peak cold viscosity of greater than 700 mPa·s;
wherein the film has a haze of less than 25% measured on a 150 micron film according to ASTM D1003; and
wherein the film has a Spencer impact of at least 20 mN/µm measured at 35% relative humidity according to ASTM D3420.

Embodiment 11

A film, said film having a thickness between 10 and 600 microns, said film comprising a starch composition comprising at least one starch, chemically modified starch or mixtures thereof;
wherein the at least one starch, chemically modified starch or mixtures thereof comprises a starch having an amylose content greater or equal to 50% by weight;
wherein the starch composition has a final viscosity of greater than 1000 mPa·s;
wherein the film has a haze of less than 25% measured on a 150 micron film according to ASTM D1003; and
wherein the film has a Spencer impact of at least 20 mN/µm measured at 35% relative humidity according to ASTM D3420.

Embodiment 12

A film, said film having a thickness between 10 and 600 microns, said film comprising a starch composition comprising at least one starch, chemically modified starch or mixtures thereof;
wherein the at least one starch, chemically modified starch or mixtures thereof comprises a starch having an amylose content greater or equal to 50% by weight;
wherein the starch composition has a degree of cook of at least 90%, preferably at least 95%;
wherein the film has a haze of less than 25% measured on a 150 micron film according to ASTM D1003; and
wherein the film has a Spencer impact of at least 20 mN/µm measured at 35% relative humidity according to ASTM D3420.

Embodiment 13

A film, said film having a thickness between 10 and 600 microns, said film comprising a starch composition comprising at least one starch, chemically modified starch or mixtures thereof;
wherein the at least one starch, chemically modified starch or mixtures thereof comprises a starch having an amylose content greater or equal to 50% by weight;
wherein the starch composition has a peak cold viscosity of greater than 700 mPa·s;
wherein the film has an OPC of less than 0.03 cm$^3$·mm/m$^2$·day·atm according to ASTM F1297.

Embodiment 14

A film, said film having a thickness between 10 and 600 microns, said film comprising a starch composition comprising at least one starch, chemically modified starch or mixtures thereof;
wherein the at least one starch, chemically modified starch or mixtures thereof comprises a starch having an amylose content greater or equal to 50% by weight;
wherein the starch composition has a final viscosity of greater than 1000 mPa·s;
wherein the film has an OPC of less than 0.03 cm$^3$·mm/m$^2$·day·atm according to ASTM F1297.

Embodiment 15

A film, said film having a thickness between 10 and 600 microns, said film comprising a starch composition comprising at least one starch, chemically modified starch or mixtures thereof;
wherein the at least one starch, chemically modified starch or mixtures thereof comprises a starch having an amylose content greater or equal to 50% by weight;
wherein the starch composition has a degree of cook of at least 90%, preferably at least 95%;
wherein the film has an OPC of less than 0.03 cm$^3$·mm/m$^2$·day·atm according to ASTM F1297.

Embodiment 16

A film, said film having a thickness between 10 and 600 microns, said film comprising a starch composition, comprising at least one starch, chemically modified starch or mixtures thereof and at least one filler;
wherein the starch composition has a peak cold viscosity of greater than 700 mPa·s.

Embodiment 17

A film, said film having a thickness between 10 and 600 microns, said film comprising a starch composition, comprising at least one starch, chemically modified starch or mixtures thereof, and at least one filler;
wherein the starch composition has a final viscosity of greater than 1000 mPa·s.

Embodiment 18

A film, said film having a thickness between 10 and 600 microns, said film comprising a starch composition comprising at least one starch, chemically modified starch or mixtures thereof, and at least one filler;
wherein the starch composition has a degree of cook of at least 90%, preferably at least 95%.

Embodiment 19

A film, said film having a thickness between 10 and 600 microns, said film comprising a starch composition comprising at least one starch, chemically modified starch or mixtures thereof, and at least one filler;
wherein the at least one starch, chemically modified starch or mixtures thereof comprises a starch having an amylose content greater or equal to 50% by weight; and
wherein the starch composition has a peak cold viscosity of greater than 700 mPa·s.

Embodiment 20

A film, said film having a thickness between 10 and 600 microns, said film comprising a starch composition comprising at least one starch, chemically modified starch or mixtures thereof, and at least one filler;
wherein the at least one starch, chemically modified starch or mixtures thereof comprises a starch having an amylose content greater or equal to 50% by weight; and
wherein the starch composition has a final viscosity of greater than 1000 mPa·s.

Embodiment 21

A film, said film having a thickness between 10 and 600 microns, said film comprising a starch composition comprising at least one starch, chemically modified starch or mixtures thereof, and at least one filler;
wherein the at least one starch, chemically modified starch or mixtures thereof comprises a starch having an amylose content greater or equal to 50% by weight; and
wherein the starch composition has a degree of cook of at least 90%, preferably at least 95%.

Embodiment 22

A film, said film having a thickness between 10 and 600 microns, said film comprising a starch composition comprising at least one starch, chemically modified starch or mixtures thereof, and at least one filler;
wherein the at least one starch, chemically modified starch or mixtures thereof comprises a starch having an amylose content greater or equal to 50% by weight;
wherein the starch composition has a peak cold viscosity of greater than 700 mPa·s; and
wherein the film has a haze of less than 25% measured on a 150 micron film according to ASTM D1003.

Embodiment 23

A film, said film having a thickness between 10 and 600 microns, said film comprising a starch composition comprising at least one starch, chemically modified starch or mixtures thereof, and at least one filler;
wherein the at least one starch, chemically modified starch or mixtures thereof comprises a starch having an amylose content greater or equal to 50% by weight;
wherein the starch composition has a final viscosity of greater than 1000 mPa·s; and
wherein the film has a haze of less than 25% measured on a 150 micron film according to ASTM D1003.

Embodiment 24

A film, said film having a thickness between 10 and 600 microns, said film comprising a starch composition comprising at least one starch, chemically modified starch or mixtures thereof, and at least one filler;
wherein the at least one starch, chemically modified starch or mixtures thereof comprises a starch having an amylose content greater or equal to 50% by weight;
wherein the starch composition has a degree of cook of at least 90% preferably at least 95%; and
wherein the film has a haze of less than 25% measured on a 150 micron film according to ASTM D1003.

Embodiment 25

A film, said film having a thickness between 10 and 600 microns, said film comprising a starch composition comprising at least one starch, chemically modified starch or mixtures thereof, and at least one filler;
wherein the at least one starch, chemically modified starch or mixtures thereof comprises a starch having an amylose content greater or equal to 50% by weight;
wherein the starch composition has a peak cold viscosity of greater than 700 mPa·s;
wherein the film has a haze of less than 25% measured on a 150 micron film according to ASTM D1003; and
wherein the film has a Spencer impact of at least 20 mN/μm measured at 35% relative humidity according to ASTM D3420.

Embodiment 26

A film, said film having a thickness between 10 and 600 microns, said film comprising a starch composition comprising at least one starch, chemically modified starch or mixtures thereof, and at least one filler;
wherein the at least one starch, chemically modified starch or mixtures thereof comprises a starch having an amylose content greater or equal to 50% by weight;
wherein the starch composition has a final viscosity of greater than 1000 mPa·s;
wherein the film has a haze of less than 25% measured on a 150 micron film according to ASTM D1003; and
wherein the film has a Spencer impact of at least 20 mN/μm measured at 35% relative humidity according to ASTM D3420.

Embodiment 27

A film, said film having a thickness between 10 and 600 microns, said film comprising a starch composition comprising at least one starch, chemically modified starch or mixtures thereof, and at least one filler;
wherein the at least one starch, chemically modified starch or mixtures thereof comprises a starch having an amylose content greater or equal to 50% by weight;
wherein the starch composition has a degree of cook of at least 90%, preferably at least 95%;
wherein the film has a haze of less than 25% measured on a 150 micron film according to ASTM D1003; and
wherein the film has a Spencer impact of at least 20 mN/μm measured at 35% relative humidity according to ASTM D3420.

Embodiment 28

A film, said film having a thickness between 10 and 600 microns, said film comprising a starch composition comprising at least one starch, chemically modified starch or mixtures thereof, and at least one filler;
wherein the at least one starch, chemically modified starch or mixtures thereof comprises a starch having an amylose content greater or equal to 50% by weight;
wherein the starch composition has a peak cold viscosity of greater than 700 mPa·s;
wherein the film has an OPC of less than 0.03 cm$^3$·mm·/ m$^2$·day·atm according to ASTM F1927.

Embodiment 29

A film, said film having a thickness between 10 and 600 microns, said film comprising a starch composition comprising at least one starch, chemically modified starch or mixtures thereof, and at least one filler;
wherein the at least one starch, chemically modified starch or mixtures thereof comprises a starch having an amylose content greater or equal to 50% by weight;
wherein the starch composition has a final viscosity of greater than 1000 mPa·s;
wherein the film has an OPC of less than 0.03 cm$^3$·mm·/ m$^2$·day·atm according to ASTM F1927.

Embodiment 30

A film, said film having a thickness between 10 and 600 microns, said film comprising a starch composition comprising at least one starch, chemically modified starch or mixtures thereof, and at least one filler;
wherein the at least one starch, chemically modified starch or mixtures thereof comprises a starch having an amylose content greater or equal to 50% by weight;
wherein the starch composition has a degree of cook of at least 90%, preferably at least 95%;
wherein the film has an OPC of less than 0.03 cm$^3$·mm·/ m$^2$·day·atm according to ASTM F1927.

In any one of embodiments 1 to 30 the film may further comprise one or more water soluble polymers as herein disclosed.

In any one or more of embodiments 1 to 30 the starch composition may further comprise a water soluble polymer selected from polyvinyl alcohol, polyoxyethylene and mixtures thereof.

Embodiment 31

A film, said film having a thickness between 10 and 600 microns, said film comprising a starch composition, comprising 50 to 98% by weight of at least one chemically modified starch, 2 to 20% by weight polyvinylalcohol and/or polyoxyethylene and 0.1 to 10% by weight hydrophilically modified layered silicate clay;
wherein the starch composition has a peak cold viscosity of greater than 700 mPa·s.

Embodiment 32

A film, said film having a thickness between 10 and 600 microns, said film comprising a starch composition, comprising 50 to 98% by weight of at least one chemically modified starch, 2 to 20% by weight polyvinylalcohol and/or polyoxyethylene and 0.1 to 10% by weight hydrophilically modified layered silicate clay;
wherein the starch composition has a final viscosity of greater than 1000 mPa·s.

Embodiment 33

A film, said film having a thickness between 10 and 600 microns, said film comprising a starch composition comprising 50 to 98% by weight of at least one chemically modified starch, 2 to 20% by weight polyvinylalcohol and/or polyoxyethylene and 0.1 to 10% by weight hydrophilically modified layered silicate clay;
wherein the starch composition has a degree of cook of at least 90%, preferably at least 95%.

Embodiment 34

A film, said film having a thickness between 10 and 600 microns, said film comprising a starch composition comprising 50 to 98% by weight of at least one chemically modified starch, 2 to 20% by weight polyvinylalcohol and/or polyoxyethylene and 0.1 to 10% by weight hydrophilically modified layered silicate clay;
wherein the at least one starch, chemically modified starch or mixtures thereof comprises a starch having an amylose content greater or equal to 50% by weight; and
wherein the starch composition has a peak cold viscosity of greater than 700 mPa·s.

Embodiment 35

A film, said film having a thickness between 10 and 600 microns, said film comprising a starch composition comprising 50 to 98% by weight of at least one chemically modified starch, 2 to 20% by weight polyvinylalcohol and/or polyoxyethylene and 0.1 to 10% by weight hydrophilically modified layered silicate clay;
wherein the at least one starch, chemically modified starch or mixtures thereof comprises a starch having an amylose content greater or equal to 50% by weight; and
wherein the starch composition has a final viscosity of greater than 1000 mPa·s.

Embodiment 36

A film, said film having a thickness between 10 and 600 microns, said film comprising a starch composition comprising 50 to 98% by weight of at least one chemically modified starch, 2 to 20% by weight polyvinylalcohol and/or polyoxyethylene and 0.1 to 10% by weight hydrophilically modified layered silicate clay;
wherein the at least one starch, chemically modified starch or mixtures thereof comprises a starch having an amylose content greater or equal to 50% by weight; and
wherein the starch composition has a degree of cook of at least 90%, preferably at least 95%.

Embodiment 37

A film, said film having a thickness between 10 and 600 microns, said film comprising a starch composition comprising 50 to 98% by weight of at least one chemically modified starch, 2 to 20% by weight polyvinylalcohol and/or polyoxyethylene and 0.1 to 10% by weight hydrophilically modified layered silicate clay;

wherein the at least one starch, chemically modified starch or mixtures thereof comprises a starch having an amylose content greater or equal to 50% by weight;
wherein the starch composition has a peak cold viscosity of greater than 700 mPa·s; and
wherein the film has a haze of less than 25% measured on a 150 micron film according to ASTM D1003.

Embodiment 38

A film, said film having a thickness between 10 and 600 microns, said film comprising a starch composition comprising 50 to 98% by weight of at least one chemically modified starch, 2 to 20% by weight polyvinylalcohol and/or polyoxyethylene and 0.1 to 10% by weight hydrophilically modified layered silicate clay;
wherein the at least one starch, chemically modified starch or mixtures thereof comprises a starch having an amylose content greater or equal to 50% by weight;
wherein the starch composition has a final viscosity of greater than 1000 mPa·s; and
wherein the film has a haze of less than 25% measured on a 150 micron film according to ASTM D1003.

Embodiment 39

A film, said film having a thickness between 10 and 600 microns, said film comprising a starch composition comprising 50 to 98% by weight of at least one chemically modified starch, 2 to 20% by weight polyvinylalcohol and/or polyoxyethylene and 0.1 to 10% by weight hydrophilically modified layered silicate clay;
wherein the at least one starch, chemically modified starch or mixtures thereof comprises a starch having an amylose content greater or equal to 50% by weight;
wherein the starch composition has a degree of cook of at least 90% preferably at least 95%; and
wherein the film has a haze of less than 25% measured on a 150 micron film according to ASTM D-1003.

Embodiment 40

A film, said film having a thickness between 10 and 600 microns, said film comprising a starch composition comprising 50 to 98% by weight of at least one chemically modified starch, 2 to 20% by weight polyvinylalcohol and/or polyoxyethylene and 0.1 to 10% by weight hydrophilically modified layered silicate clay;
wherein the at least one starch, chemically modified starch or mixtures thereof comprises a starch having an amylose content greater or equal to 50% by weight;
wherein the starch composition has a peak cold viscosity of greater than 700 mPa·s;
wherein the film has a haze of less than 25% measured on a 150 micron film according to ASTM D1003; and
wherein the film has a Spencer impact of at least 20 mN/μm measured at 35% relative humidity according to ASTM D3420.

Embodiment 41

A film, said film having a thickness between 10 and 600 microns, said film comprising a starch composition comprising 50 to 98% by weight of at least one chemically modified starch, 2 to 20% by weight polyvinylalcohol and/or polyoxyethylene and 0.1 to 10% by weight hydrophilically modified layered silicate clay;
wherein the at least one starch, chemically modified starch or mixtures thereof comprises a starch having an amylose content greater or equal to 50% by weight;
wherein the starch composition has a final viscosity of greater than 1000 mPa·s;
wherein the film has a haze of less than 25% measured on a 150 micron film according to ASTM D1003; and
wherein the film has a Spencer impact of at least 20 mN/μm measured at 35% relative humidity according to ASTM D3420.

Embodiment 42

A film, said film having a thickness between 10 and 600 microns, said film comprising a starch composition comprising 50 to 98% by weight of at least one chemically modified starch, 2 to 20% by weight polyvinylalcohol and/or polyoxyethylene and 0.1 to 10% by weight hydrophilically modified layered silicate clay;
wherein the at least one starch, chemically modified starch or mixtures thereof comprises a starch having an amylose content greater or equal to 50% by weight;
wherein the starch composition has a degree of cook of at least 90%, preferably at least 95%;
wherein the film has a haze of less than 25% measured on a 150 micron film according to ASTM D1003; and
wherein the film has a Spencer impact of at least 20 mN/μm measured at 35% relative humidity according to ASTM D3420.

Embodiment 43

A film, said film having a thickness between 10 and 600 microns, said film comprising a starch composition comprising 50 to 98% by weight of at least one chemically modified starch, 2 to 20% by weight polyvinylalcohol and/or polyoxyethylene and 0.1 to 10% by weight hydrophilically modified layered silicate clay;
wherein the at least one starch, chemically modified starch or mixtures thereof comprises a starch having an amylose content greater or equal to 50% by weight;
wherein the starch composition has a peak cold viscosity of greater than 700 mPa·s;
wherein the film has an OPC of less than 0.03 cm$^3$·mm/m$^2$·day·atm according to ASTM F1927.

Embodiment 44

A film, said film having a thickness between 10 and 600 microns, said film comprising a starch composition comprising 50 to 98% by weight of at least one chemically modified starch, 2 to 20% by weight polyvinylalcohol and/or polyoxyethylene and 0.1 to 10% by weight hydrophilically modified layered silicate clay;
wherein the at least one starch, chemically modified starch or mixtures thereof comprises a starch having an amylose content greater or equal to 50% by weight;
wherein the starch composition has a final viscosity of greater than 1000 mPa·s;
wherein the film has an OPC of less than 0.03 cm$^3$·mm/m$^2$·day·atm according to ASTM F1927.

Embodiment 45

A film, said film having a thickness between 10 and 600 microns, said film comprising a starch composition comprising 50 to 98% by weight of at least one chemically modified starch, 2 to 20% by weight polyvinylalcohol and/or polyoxyethylene and 0.1 to 10% by weight hydrophilically modified layered silicate clay;
wherein the at least one starch, chemically modified starch or mixtures thereof comprises a starch having an amylose content greater or equal to 50% by weight;
wherein the starch composition has a degree of cook of at least 90%, preferably at least 95%;
wherein the film has an OPC of less than 0.03 cm³·mm·/m²·day·atm according to ASTM F1927.

In any one of embodiments 1 to 45 the film may have an OPC of less than 0.02 cm³·mm·/m²·day·atm, or less than 0.01 cm³·mm·/m²·day·atm, or less than 0.005 cm³·mm·/m²·day·atm according to ASTM F1927 measured at 50% relative humidity.

In any one of embodiments 1 to 45 the starch composition may be prepared by at least the step of melt processing the starch composition under conditions sufficient to impart a specific mechanical energy of at least about 450 kJ/kg, or at least about 500 kJ/kg, or at least about 600 kJ/kg, or at least about 700 kJ/kg, or at least about 800 kJ/kg, or at least about 900 kJ/kg.

There is also provided a multilayer film comprising a layer comprising a film according to any one of embodiments 1 to 45 and at least one other layer selected from the group consisting of polyolefin, polyethylene terephthalate, polyethylene terephthalate glycol, polybutylene succinate, polyhydroxy butyrate, polylactic acid, nylon, polyvinylchloride, polyvinylidene dichloride, cellulose, a water resistant protein layer, a water resistant layer comprising silica and combinations thereof.

EXAMPLES

Viscosity Measurement

Starch composition solution viscosities were measured using a Rapid Visco Analyser Model RVA Super 3 (Newport Scientific, Sydney, New South Wales, Australia). The RVA viscosity is defined as the viscosity measured by the following procedure.

A weight of starch composition containing 2.5 g of starch (dry weight basis) to be measured was mixed with about 25 g of distilled water to give a total weight of 28 g based on the amount of starch in the composition, and the mixture was added to the instrument cup. The instrument mixing parameters are as follows: mix at 960 rpm for 30 seconds and 160 rpm for 36.5 minutes. The instrument temperature parameters are as follows: 15 minutes at 30° C., heating from 30° C. to 95° C. for 5 minutes, 3 minutes hold at 95° C., cooling from 95° C. to 30° C. for 3 minutes, 11 minutes hold at 30° C., for a total of 37 minutes. The peak cold viscosity is the maximum viscosity prior to initiating heating, that is, the maximum viscosity during the initial 15 minutes at 30° C. The final viscosity is the maximum viscosity during the 11 minute holding at 30° C.

Property Measurements

Oxygen transmission rate of films of the starch compositions was measured according to ASTM F1927 at 50% relative humidity.

Haze of films prepared from the starch compositions was measured on a 150 micron film according to ASTM D1003.

Spencer impact of both unformed sheets and biaxially orientated sheets (draw ratio 2.2) prepared from the starch compositions was measured according to ASTM D3420 at 35% relative humidity.

Preparation of Starch Compositions

Example 1

Starch compositions were prepared by extrusion processing a mixture of about 90% by weight modified starch (ECOFILM™, Ingredion), about 9% by weight polyvinylalcohol (Elvanol™71-30) and 0.5% stearic acid. Specific mechanical energy (SME) was controlled by varying extruder screw speed.

The solution viscosities of starch compositions extruded with varying SME were measured using a RVA in accordance with the above described method. The results are collected in Table 1. Ratio refers to the ratio of RVA peak cold viscosity to RVA final viscosity.

TABLE 1

| Sample No. | SME (kJ/kg) | RVA peak cold (mPa · s) | RVA final (mPa · s) | Ratio | Spencer Impact (35% RH) (mN/μm) | Haze (%) |
|---|---|---|---|---|---|---|
| 1 | 267 | 683 | 1172 | 0.58 | 2.25 | 27 |
| 2 | 458 | 978 | 1192 | 0.82 | 2.58 | 16 |
| 3 | 603 | 1107 | 1108 | 1.00 | 3.81 | 17 |
| 4 | 750 | 1250 | 1100 | 1.14 | 3.58 | 17 |
| 5 | 1700 | 1250 | 881 | 1.42 | 3.29 | 21 |

FIG. 1 illustrates the RVA viscosity profiles of Samples 1 to 5 and the temperature profile during the measurements.

Referring to Table 1 and FIG. 1, each of inventive samples 2 to 5 have a peak cold viscosity of greater than 700 mPa·s. These were prepared with a specific mechanical energy greater than 400 kJ/kg. Sample 1 (comparative), prepared with low SME, has a low peak cold viscosity. This sample also had very poor optical and mechanical properties.

The oxygen transmission rates of 150 micron films prepared with two different starch compositions (prepared as per the compositions in Table 1) and having a cold peak viscosity of 1255 and 683 mPa·s and prepared with specific mechanical energies of, respectively, 1700 kJ/kg and 250 kJ/kg were measured at 50% relative humidity. The oxygen transmission rates were, respectively, <0.01 and 0.25 cm³/m²·day·atm. It is evident that the film prepared with a starch composition having high cold peak viscosity had much superior oxygen barrier.

Example 2

Figure 2:
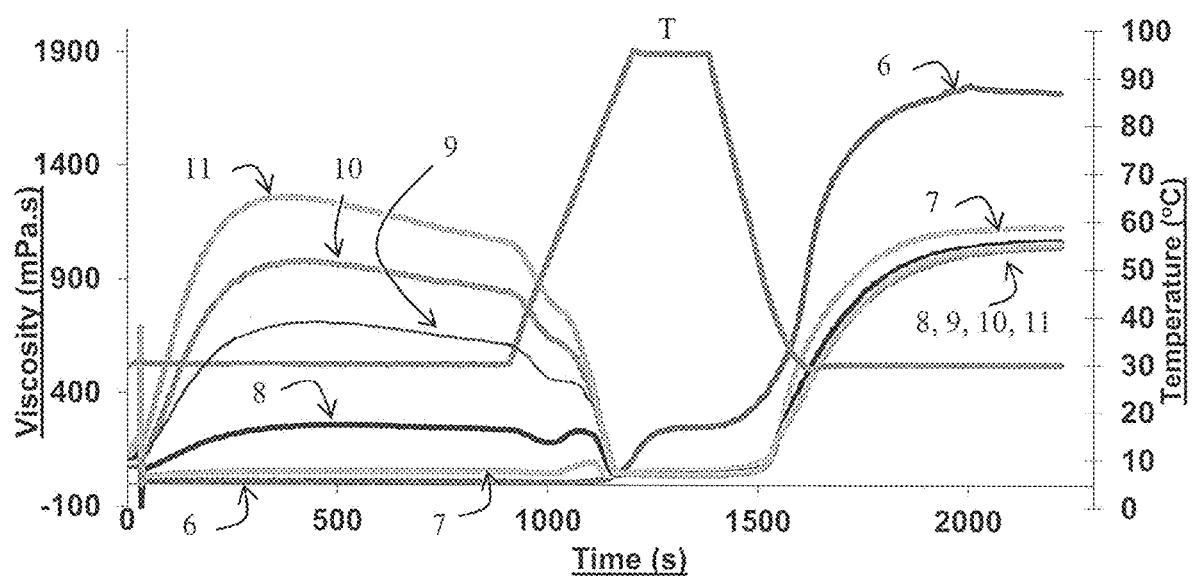
FIG. 2 is a plot of starch composition solution viscosity as a function of temperature and time.

Blends of the fully cooked starch composition of Sample No. 4 from Example 1 with uncooked composition (that is, non-extrusion processed material) were prepared according to Table 2. The % Sample 4 equates to the percentage conversion to fully cooked starch composition. The viscosities of these blends were measured and compared to the uncooked composition (Sample 6). FIG. 2 illustrates the RVA solution viscosity profiles of these blends along with the temperature profile during the measurement. It is evident that the peak cold viscosity increased from Sample 6 through 11. Using the peak cold viscosities and percentage conversions, a predictive model was constructed which provided the following relationship:

Peak cold viscosity=$A1*\exp(A2*\%$ conversion)

where A1=3.2988695
A2=5.964065

Figure 3:
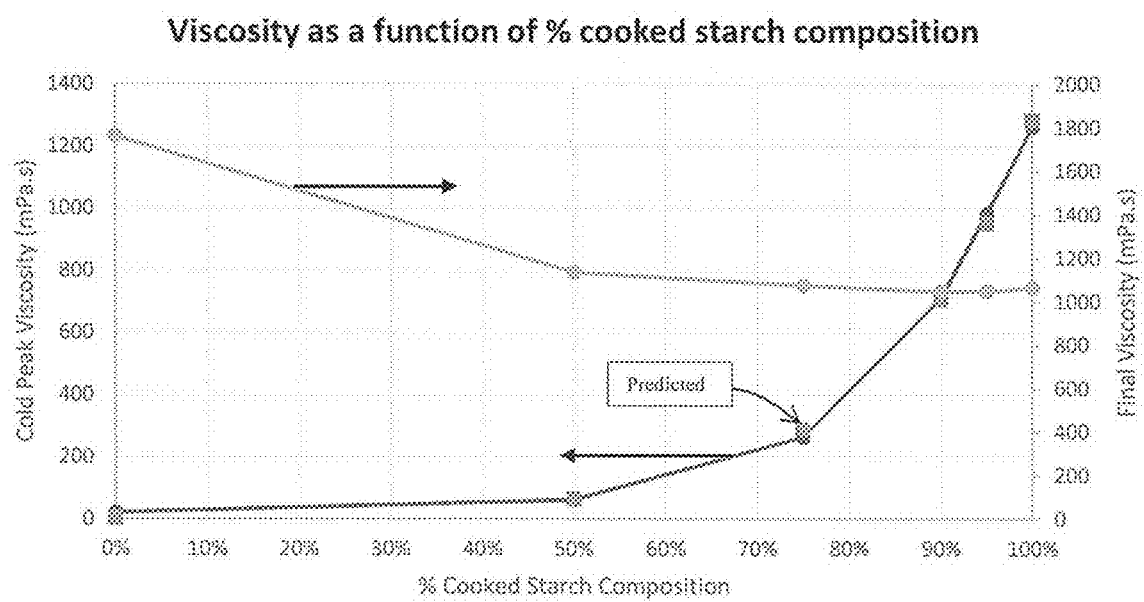
FIG. 3 is a plot of the cold peak and final solution viscosities of starch compositions as a function of conversion.

The predicted peak cold viscosities are tabulated in Table 2 and illustrated as the squares in FIG. 3, along with the measured peak cold and final viscosities. Rearranging the above equation affords the following relationship which allows a prediction of percentage conversion to be made based on measurement of peak cold viscosity.

% Conversion=$\ln(PCV/A1/A2)$ where PCV is peak cold viscosity

Referring to Table 2 a degree of cook (% conversion) at or above 90% is required in order to achieve a peak cold viscosity of greater than 700 mPa·s.

TABLE 2

| Sample No. | % Sample 4 | RVA peak cold (mPa · s) | RVA final (mPa · s) | Predicted Peak cold viscosity (mPa · s) |
|---|---|---|---|---|
| 6 | 0 | 21 | 1762 | 3.3 |
| 7 | 50 | 62 | 1136 | 65.1 |
| 8 | 75 | 264 | 1075 | 289.1 |
| 9 | 90 | 713 | 1047 | 707.1 |
| 10 | 95 | 983 | 1049 | 952.8 |
| 11 | 100 | 1264 | 1063 | 1283.9 |

Example 3

In a further series of experiments starch compositions were prepared according to Example 1 except that about 2% by weight of Nanomer I.40P (Nanocor, Inc) hydrophobically modified clay was also present. Compositions were extruded processed with varying SME. The RVA results, along with product properties, are collected in Table 3.

TABLE 3

| Sample No. | SME (kJ/kg) | RVA peak cold (mPa · s) | RVA final (mPa · s) | Ratio | Spencer Impact (35% RH) (mN/μm) | Haze (%) |
|---|---|---|---|---|---|---|
| 12 | 365 | 1493 | 681 | 2.2 | 17.5 | 16.3 |
| 13 | 657 | 1706 | 653 | 2.6 | 22.7 | 9.3 |
| 14 | 687 | 1712 | 584 | 2.9 | 25.6 | 9.2 |
| 15 | 717 | 1644 | 556 | 2.9 | 26.0 | 9.5 |

TABLE 3-continued

| Sample No. | SME (kJ/kg) | RVA peak cold (mPa · s) | RVA final (mPa · s) | Ratio | Spencer Impact (35% RH) (mN/μm) | Haze (%) |
|---|---|---|---|---|---|---|
| 16 | 746 | 1561 | 601 | 2.6 | 24.4 | 10.1 |
| 17 | 1712 | 1624 | 390 | 4.2 | 28.1 | 9.0 |

Addition of the modified clay resulted in an improvement of impact strength and haze relative to the clay free compositions of Example 1. However, samples processed with a SME of greater than 400 kJ/kg all produced films having low haze and high impact strength compared to the sample prepared at low SME (Sample 12).

The oxygen transmission rates of 150 micron films prepared with two different starch compositions (prepared as per the compositions in Table 3) prepared with high and low specific mechanical energies were measured at 50% relative humidity. The oxygen transmission rates were, respectively, <0.01 and 0.30 $cm^3/m^2 \cdot day \cdot atm$. It is evident that the film prepared with a starch composition prepared under conditions of high SME had much superior oxygen barrier.

Example 4

In a further series of experiments starch compositions were prepared according to Example 1 except that the starch component was varied so as to adjust the amylose content. This was achieved by mixing appropriate amounts of ECO-FILM™, which has an amylose content of 70% by weight with National 7 (Ingredion), which has an amylose content of 20%. Additionally, about 2% by weight of a hydrophobically modified layered silicate clay (CLOISITE™ 20A) was added. Details of the resulting compositions, RVA results and product properties are collected in Table 4.

TABLE 4

| Sample No. | Ecofilm (wt. %) | National 7 (wt. %) | Amylose (%) | Haze (%) | Unformed Sheet Spencer Impact (mN/μm) | Drawn Sheet Spencer Impact (mN/μm) | RVA cold peak mPa · s | RVA final mPa · s | Ratio |
|---|---|---|---|---|---|---|---|---|---|
| 18 | 100 | 0 | 70 | 6.7 | 24.5 | 30.5 | 1126 | 406 | 2.77 |
| 19 | 80 | 20 | 60 | 8.1 | 19.9 | 22.8 | 1105 | 296 | 3.73 |
| 20 | 60 | 40 | 50 | 10.9 | 20.0 | 19.6 | 825 | 255 | 3.24 |
| 21 | 40 | 60 | 40 | 15.9 | 16.8 | 17.5 | 1023 | 263 | 3.89 |
| 22 | 20 | 80 | 30 | 21.7 | 18.3 | 17.8 | 1122 | 276 | 4.07 |
| 23 | 0 | 100 | 20 | 15.4 | 15.7 | 20.1 | 1170 | 245 | 4.78 |

The results in Table 4 clearly indicate that increasing the amylose content of the starch improved the film haze and sheet impact strengths.

Example 5

In a further series of experiments starch compositions were prepared according to Example 1 except that the starch component was varied so as to adjust the amylose content. This was achieved by mixing appropriate amounts of ECO-FILM™, which has an amylose content of 70% by weight with National 7 (Ingredion), which has an amylose content of 20%. No clay component was present in the compositions. Details of the resulting compositions, RVA results and product properties are collected in Table 5.

TABLE 5

| Sample No. | Ecofilm (wt. %) | National 7 (wt. %) | Amylose (%) | Haze (%) | Unformed Sheet Spencer Impact (mN/μm) | Drawn Sheet Spencer Impact (mN/μm) | RVA cold peak mPa·s | RVA final mPa·s | Ratio |
|---|---|---|---|---|---|---|---|---|---|
| 24 | 100 | 0 | 70 | 10.3 | 40.4 | 42.8 | 1365 | 908 | 1.50 |
| 25 | 80 | 20 | 60 | 8.7 | 36.4 | 29.7 | 1061 | 538 | 1.97 |
| 26 | 60 | 40 | 50 | 16.7 | 19.3 | 1.3 | 863 | 340 | 2.54 |
| 27 | 40 | 60 | 40 | 25.8 | 15.3 | 5.6 | 862 | 283 | 3.05 |
| 28 | 20 | 80 | 30 | 32.5 | 12.2 | 1.4 | 711 | 209 | 3.40 |
| 28 | 0 | 100 | 20 | 35.4 | 5.1 | 1.8 | 1629 | 234 | 6.96 |

The results in Table 5 clearly indicate that increasing the amylose content of the starch improved the film haze and sheet impact strengths.

Example 6

In a further series of experiments starch compositions were prepared according to Example 1 except that the starch component was varied so as to adjust the amylose content. This was achieved by mixing appropriate amounts of ECO-FILM™, which has an amylose content of 70% by weight with National 7 (Ingredion), which has an amylose content of 20%. Additionally, about 2% by weight of a layered silicate clay in the Na+ form (not modified with a surfactant) was added. Details of the resulting compositions, RVA results and product properties are collected in Table 6.

TABLE 6

| Sample No. | Ecofilm (wt. %) | National 7 (wt. %) | Amylose (%) | Haze (%) | Unformed Sheet Spencer Impact (mN/μm) | Drawn Sheet Spencer Impact (mN/μm) | RVA cold peak mPa·s | RVA final mPa·s | Ratio |
|---|---|---|---|---|---|---|---|---|---|
| 29 | 100 | 0 | 70 | 18.1 | 19.3 | 26.3 | 1262 | 1009 | 1.25 |
| 30 | 80 | 20 | 60 | 20.7 | 19.8 | 24.0 | 1028 | 658 | 1.56 |
| 31 | 60 | 40 | 50 | 22.6 | 19.1 | 24.0 | 769 | 416 | 1.85 |
| 32 | 40 | 60 | 40 | 31.0 | 20.3 | 21.6 | 786 | 329 | 2.39 |
| 33 | 20 | 80 | 30 | 38.4 | 14.9 | 22.0 | 811 | 263 | 3.08 |
| 34 | 0 | 100 | 20 | 27.6 | 16.0 | 21.8 | 1463 | 244 | 6.00 |

The results in Table 6 clearly indicate that increasing the amylose content of the starch improved the film haze and sheet impact strengths. However, the non-modified clay resulted in poorer properties relative to compositions with no added clay or hydrophobically modified clay.

Example 7

In a further series of experiments starch compositions were prepared according to Example 1 except that a polyol plasticiser was added to the starch composition. The polyol plasticiser was a mixture of glycerol, sorbitol, maltitol and xylitol. Details of the resulting compositions and RVA results are collected in Table 7.

TABLE 7

| Sample No. | Starch source | Amylose (%) | Polyol (wt. %) | RVA cold peak mPa·s | RVA final mPa·s | Ratio |
|---|---|---|---|---|---|---|
| 35 | Ecofilm | 70 | 0 | 1737 | 811 | 2.1 |
| 36 | Ecofilm | 70 | 40 | 1757 | 594 | 4.8 |

TABLE 7-continued

| Sample No. | Starch source | Amylose (%) | Polyol (wt. %) | RVA cold peak mPa·s | RVA final mPa·s | Ratio |
|---|---|---|---|---|---|---|
| 37 | National 7 | 20 | 0 | 4264 | 366 | 11.6 |
| 38 | National 7 | 20 | 40 | 2660 | 349 | 7.6 |

The contents of all references, including published patents and patent applications cited throughout the application are hereby incorporated by reference.

It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

The invention claimed is:
1. An extruded starch composition comprising:
   at least one starch, chemically modified starch, or mixtures thereof;
   one or more water soluble polymers; and
   optionally, water, with the starch composition being free of a polyol plasticizer, wherein the one or more water soluble polymers are selected from the group consisting of polyvinyl acetate, polyvinyl alcohol, polyalkylene oxide having a molecular weight of at least 10,000 Da, or mixtures thereof, the extruded starch composition has a peak cold viscosity of greater than about 700 mPa·s, a final viscosity greater than about 300 mPa·s, and a ratio of the peak cold viscosity to the final viscosity of greater than or equal to about 1.0.

2. The starch composition according to claim 1, wherein the peak cold viscosity is greater than about 750 mPa·s, or greater than about 800 mPa·s, or greater than about 850 mPa·s, or greater than about 900 mPa·s, or greater than about 950 mPa·s, or greater than about 1000 mPa·s, or greater than about 1150 mPa·s, or greater than about 1200 mPa·s, or greater than about 1250 mPa·s, or greater than about 1300 mPa·s.

3. The starch composition according to claim 1, wherein the peak cold viscosity is greater than about 1350 mPa·s, or greater than about 1400 mPa·s, or greater than about 1450 mPa·s, or greater than about 1500 mPa·s, or greater than about 1550 mPa·s, or greater than about 1600 mPa·s.

4. The starch composition according to claim 1, wherein a final viscosity of the starch composition is greater than 400 mPa·s, or greater than about 500 mPa·s, or greater than about 600 mPa·s.

5. The starch composition according to claim 1, wherein a ratio of the peak cold viscosity of the starch composition to a final viscosity of the starch composition is greater than or equal to about 1.1, or greater than or equal to about 1.2, or greater than or equal to about 1.3, or greater than or equal to about 1.4, or greater than or equal to about 1.5, or greater than or equal to about 1.6.

6. The starch composition according to claim 1, wherein the amylose content of the starch is greater than about 10% by weight, or greater than about 20% by weight, or greater than about 30% by weight, or greater than about 40% by weight, or greater than about 50% by weight, or greater than about 60% by weight, or greater than about 70% by weight, or greater than about 80% by weight.

7. The starch composition according to claim 1, wherein the modified starch is chemically modified so as to replace hydroxyl functionality with functionality selected from the group consisting of ethers, esters and mixtures thereof.

8. The starch composition according to claim 1, wherein the modified starch is chemically modified to include a hydroxyalkyl $C_{2-6}$ group or modified by reaction with an anhydride of a carboxylic acid.

9. The starch composition according to claim 1, further comprising one or more fillers or nanomaterials.

10. The starch composition according to claim 9 wherein the amount of filler is up to 20% by weight based on the total dry weight of the starch composition.

11. The starch composition according to claim 9, wherein the nanomaterials are hydrophobically or hydrophilically modified.

12. The starch composition according to claim 11, wherein the nanomaterial comprises hydrophobically modified layered silicate clays.

13. A film comprising the starch composition according to claim 1.

14. The film according to claim 13, wherein the film has a Spencer impact of at least 20 mN/μm measured at 35% relative humidity according to ASTM D3420.

15. The film according to claim 13, wherein the film has an oxygen permeation coefficient of less than 0.05 $cm^3$ mm/$m^2$·24 h·atm at 50% relative humidity (RH), or less than 0.03 $cm^3$ mm/$m^2$·day·atm, or less than 0.01 $cm^3$ mm/$m^2$·24 h·atm at 50% relative humidity (RH).

16. The film according to claim 13, wherein the film has a thickness of 150 micron and has a haze of less than 25%, when measured according to ASTM D1003.

17. A multilayer film comprising a layer comprising the film according to claim 16 and at least one other layer.

* * * * *